United States Patent [19]

Petronko

[11] Patent Number: 4,696,324

[45] Date of Patent: Sep. 29, 1987

[54] HEAT FOAM INSULATION JACKET

[76] Inventor: Dennis A. Petronko, 1490 Redfern Dr., Pittsburgh, Pa. 15241

[21] Appl. No.: 914,379

[22] Filed: Oct. 2, 1986

[51] Int. Cl.$^4$ .............................................. F16L 7/00
[52] U.S. Cl. ...................................... 137/375; 285/47
[58] Field of Search ........................... 137/375; 285/47

[56] References Cited

U.S. PATENT DOCUMENTS

| | | | |
|---|---|---|---|
| 780,843 | 1/1905 | Wallace | 285/47 |
| 1,108,840 | 8/1914 | Franke | 137/375 |
| 3,556,158 | 1/1971 | Schneider | 285/47 |
| 3,677,303 | 7/1972 | Martin | 285/47 |
| 3,724,491 | 4/1973 | Knudsen | 137/375 |
| 4,207,918 | 6/1980 | Burns | 137/375 |
| 4,259,981 | 4/1981 | Busse | 137/375 |
| 4,448,218 | 5/1984 | Vetter | 285/47 |
| 4,484,386 | 11/1984 | Stonitsch | 285/47 |
| 4,556,082 | 12/1985 | Riley et al. | 137/375 |

FOREIGN PATENT DOCUMENTS 3534174  4/1986  Fed. Rep. of Germany ........ 285/47

Primary Examiner—A. Michael Chambers
Attorney, Agent, or Firm—Patricia Kuker Staub

[57] ABSTRACT

A unitary removable and reuseable jacket for the thermal insulation of pipe accouterments is disclosed. The fully-formed generally-rectangular jacket is composed of three layers: a heat and water resistant outer fabric layer, a hardened rigid-cell polyurethane middle layer, and a thin flexible heat-shrinkable plastic inner layer. The inner and outer layers are joined together by perimeter seams and a transverse center seam which form two pockets adapted to contain the polyurethane foam middle layer. Said inner and outer layers are formed at time of manufacture while the middle layer is formed during the application process. During the application process, an exothermic chemical reaction is generated by the combination of the chemicals polyol and isocyanate which are inserted between the inner and outer layers through holes contained in the outer layer, to form a rapidly expanding and hardening rigid cell polyurethane foam middle layer. During the application of the jacket around the accouterment, in response to the exothermic chemical reaction, the inner layer shrinks to fit the exact shape of the underlying pipe, as does the rigid-cell middle layer which is being formed. When installation is complete, the jacket may be removed and reused by using pressure to "crack" the transverse seam dividing the middle layer into two pockets which are positioned on opposite sides of the accouterment.

9 Claims, 5 Drawing Figures

HEAT FOAM INSULATION JACKET

This jacket may be used for the insulation of any valve, or other pipe accouterment, wherein the shape of the item to be insulated is irregular, unpredictable, or varied in size. Until now, it has been necessary to custom-fit all insulation covers in order to provide maximum insulation of the accouterment. Attempts at producing a universal cover have been less than successful, due to the inability of "universal" covers to mold to the exact contours of the underlying accouterment. This jacket, for the first time, provides an inexpensive universal insulation cover which becomes custom-molded upon application rather than at time of manufacture, is removable and reuseable, and is not subject to the extent of degradation experienced by current state of the art insulating devices.

BACKGROUND OF THE INVENTION

There are many reasons to insulate pipes, fittings et cetera. One of the most important reasons for insulation is to save energy during the conduction of materials through pipes. Many manufacturing processes require the transportation of liquids and gases through lines at a specific pressure or temperature without reheating or cooling. Also, many processes demand the uninterrupted maintenance of certain temperatures to facilitate the movement of materials through the pipelines.

In addition, the chemistry of many processes demands that internal temperature be maintained within very rigid requirements. Contributing further to the problem, is the fact that the function of many pipe lines dictates their exposure to the extremes of weather change occurring outside factory buildings. Today, freeze-ups occur every winter and cause loss of production in many plants, even in the Southern parts of this country.

The use of various devices to insulate pipe accouterments is well-known in the art. A two-part metal insulating shell is disclosed in U.S. Pat. No. 1,108,840. The two portions of this shell are adapted through custom manufacture to fit around the accouterment and mate with each other by means of interlocking flanges. The device is adapted to form collars or rings which receive asbestos packing as the insulating agent.

A major drawback of this device is the need to obtain the exact measurements of each accouterment prior to manufacture of each custom-fit insulating shell, causing attendant delay and additional expense. Another drawback is the limited usefulness of asbestos an insulator, both from the standpoint of its safety and efficacy as well as from its sporadic placement within the metal shell.

The present invention addresses these problems by providing an inexpensive standardized jacket which only becomes customized upon application rather than at time of manufacture, and which utilizes the superior insulating and safety features of a closed-cell polyurethane foam insulating layer uniformly enveloping the accouterment.

U.S. Pat. No. 3,724,491, discloses a device for insulating pipe accouterments which is composed of a plurality of metal sections which mate together to enclose the accouterment.

Each section includes an outer metallic sheeting and an inner metallic sheeting connected to the outer metallic sheeting to define a space therebetween into which insulation material is provided. The metal sections are removably connected together around the accouterment. Because the inner sheeting is formed of metal the shell does not fit the exact contours of the accouterment.

It is also necessary in the above invention, to permanently attach and maintain a clamp to the device to maintain an inward pressure against the pipe. The present invention solves these difficulties by providing the superior insulating qualities of a closed-cell foam, not allowing for vapor penetration of the foam layer, not allowing the insulation layer to become exposed or degraded upon removal, and eliminating the necessity of a clamp during use.

U.S. Pat. No. 4,207,918 discloses an insulation jacket made of fiberglass fabric and containing a plurality of parts including a skirt, jacket and cap. A flexible mat inner layer is provided for insulation, and the jacket is strapped to the pipe. Drawbacks inherent in this device are that the flexible inner mat layer has a tendency to "settle" in response to the forces of gravity and can degrade upon exposure of the jacket to caustic substances. Gaps can occur throughout the jacket layers in areas where the straps cause folds to occur in the jacket layers. Additionally, customized manufacture becomes even more necessary due to the fact that the jacket is composed of a plurality of parts. The present invention addresses these problems by providing a standardized one-piece jacket with a non-settling and non-reactive insulating layer which molds to fit to the exact shape of the underlying accouterment without exposure to the atmosphere or degradation.

U.S. Pat. No. 4,448,218 discloses an device which is used to seal leaks in pipes through the use of a rectangular inflatable rubber pad. This device is not particularly germane to this invention as it contemplates "patching" pipes rather than insulting pipe accouterments. It utilizes air which has almost no insulating properties and also is not suitable for application over sharp and irregular-shaped accouterments which could easily puncture the rubber exterior.

U.S. Pat. No. 4,556,082 discloses a unitary and removable insulating jacket for accouterments having inner and outer layers composed of aluminized and siliconized fiberglass material, and containing a 1" thick fiberglass middle layer. The jacket uses drawstrings to wrap the jacket in a diaper-like manner around the accouterment. Although this cover does have the advantage that it doesn't need custom manufacturing, there still exists a major drawback, because it does not conform to the exact shape of the underlying pipe accouterment. This gaping then leads to the formation of pockets of air between the insulating jacket and the pipe where pools of liquid may collect within the jacket itself causing degradation of the middle layer.

None of the foregoing inventions teaches a standardized one-piece insulation jacket which utilizes a heat-shrinkable inner layer in combination with a relatively inflexible outer fabric layer to form two oppositely-positioned pockets adapted to contain a middle layer which is created and formed at the time of application. Nor do the foregoing inventions disclose an inexpensive closed-cell foam insulating jacket which can be molded precisely to the shape of the underlying accouterment, without exposing its inner layers to the environment, without being custom-designed, and without allowing its insulation layer to settle or degrade, even upon removal from the accouterment.

SUMMARY OF THE INVENTION

A primary object of this invention is to provide a low-cost, easily removable, one-piece thermal insulation jacket for the insulation of valves and other pipe accouterments which will employ the superior insulating qualities found in commercially-available rigid-cell polyurethane foam without the attendant expense of complicated and ineffective application procedures, and custom design problems now being experienced in the market.

Another object of this invention is to provide a insulation jacket which will accommodate a wide range of pipe and valve diameters and shapes without special tailoring regardless of either the original shape of the pipe or the subsequently altered shape of that valve in the field.

Another object of this invention is to provide a thermal insulation jacket for pipe accouterments in which the insulation layer does not degrade upon exposure to either caustic substances or the atmosphere, remains impervious to a wide range of chemicals, does not settle-out in response to gravity, does not need repaired or replaced (wear out) when removed and reused, and can be applied quickly by untrained personnel.

It will become apparent to the reader that the present invention does accomplish all of the above objectives. The insulation jacket, as described in its preferred embodiment, is generally rectangular and essentially flat prior to installation. At the time of manufacture, an inner and outer layer are sewn together by means of a perimeter seam and at least one centrally-located transverse seam. This arrangement produces two independent and fully-enclosed pockets in the jacket which are adapted to receive a middle layer at the time of application by means of two holes located in the outer jacket.

The outer layer is fabricated in aluminized silicon-impregnated fiberglass material, however nonaluminized material may also be used for lower temperature applications. The nonreactive, temperature-resistant, and water-resistant properties of this fabric make it an ideal material for use as an outer-layer.

The inner layer, in contrast, is fabricated out of a thin and flexible heat-resistant plastic polyurethane or polycarbonate film.

The outer jacket layer typically contains two u-shaped concavities on either end of the jacket, which correspond to the neck of the valve or accouterment, however, it would be possible to construct a jacket without such concavities. On either side of the concavity located on one end, buckles or other fastening means are provided; co-operating straps are provided on either side of the concavity of the other end, such that the jacket can be fastened, end to end, in a loose circular fashion, around the pipe accouterment.

After the jacket is fastened in a loose circular fashion around the accouterment, a middle foam layer is formed and inserted into the holes provided in the outer layer to access the pockets formed between the inner and outer layers.

The preferred method of establishing the foam middle layer is to inject the chemicals polyol and isocyanate present in a preferred ratio of 0.93:1.00 into the jacket holes through a common mixing nozzle attached to canisters of each chemical. Within a period of approximately 0-20 seconds, the chemicals become mixed; within approximately 20-180 seconds, the mixture continues to expand and form a rapidly hardening rigid-cell polyurethane foam with an average density of 4.0 lbs per cubic foot. The insertion of this chemical mixture can occur simultaneously through both holes, or can occur in quick succession without difficulty if only one technician is present.

The heat generated by the aforementioned exothermic reaction causes the heat-sensitive inner layer to "shrink-wrap" the pipe. The rapidly expanding middle layer, subject to the external pressure of the semi-rigid outer layer which has been fastened to itself, is forced to expand selectively inward, assuming the same shape as the inner layer and underlying accouterment. Application of slight upward pressure is beneficial at this time, as it allows the expansion of the foam to fully enclose the head of the protruding valve or accouterment. As the foam continues to harden, a rigid, impermeable and fully-enclosed insulating layer is formed around the accouterment.

After the jacket has fully formed and hardened, it is possible to remove the jacket without causing damage to the insulation layer. The buckles on the ends of the outer jacket are unfastened and a downward pressure is then applied to "crack" the jacket along the "hinge-like" central transverse seam which separates the two pockets of foam from one another. Replacement of the jacket merely requires placing the molded jacket around the pipe and refastening the buckles.

In its preferred embodiment, the length of the generally-rectangular outer layer of the jacket is greater than that of the generally rectangular inner layer. This embodiment requires the presence of a seam traveling the perimeter of the shorter of the two layer as well as an optional perimeter seam traveling the perimeter of the exposed outer layer flap.

The advantage of allowing the outer layer to overlap with itself in a flap-like manner, without requiring the bulky inner layer to overlap with itself, is that external precipitation is prevented from penetrating along the insulation pocket seams to come into contact with the accouterment without doubling the bulk of the jacket. It is possible, however, to construct a jacket where the generally-rectangular inner and outer layers are of the same length and width so that no overlap occurs on the ends of the jacket where the buckles are located.

It is to be understood that the forms of this jacket described herein are to be taken as preferred examples, and that various changes in the shape, size, and arrangement of parts may occur without departing from the spirit of the invention of the scope of the subjoined claims

DETAILED DESCRIPTION OF THE DRAWINGS

Figure 1:
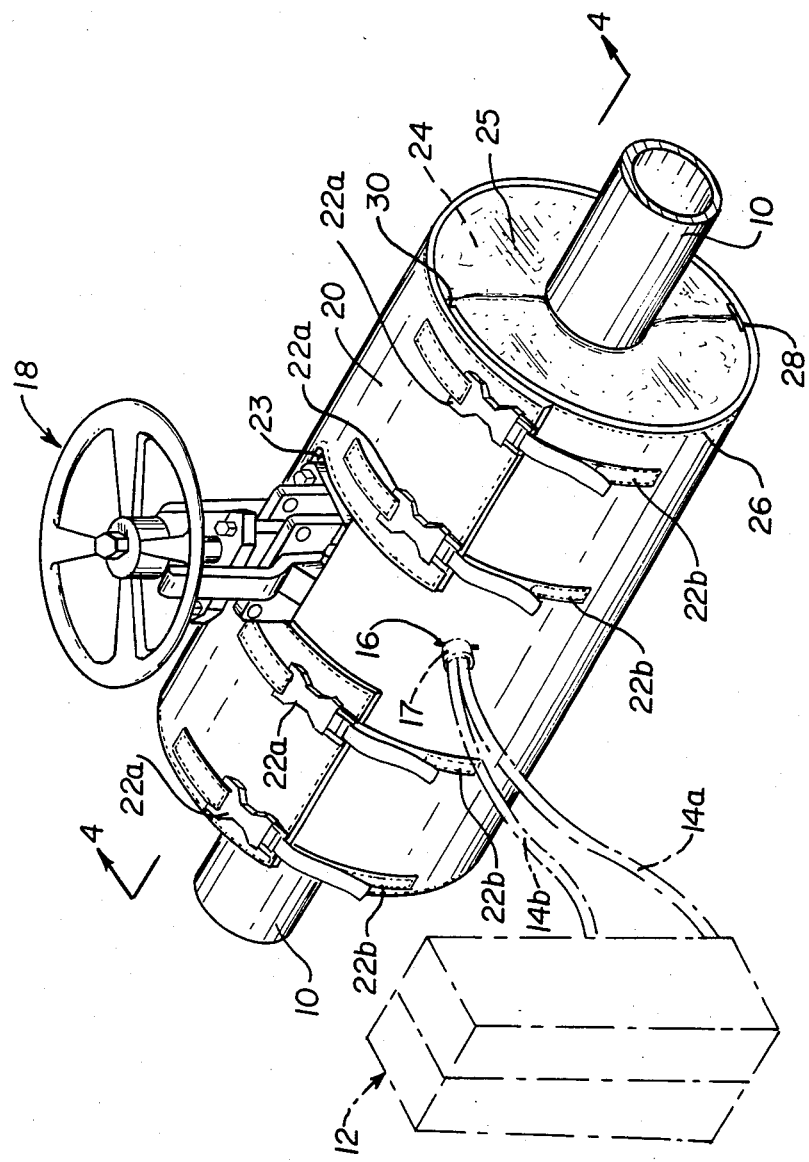
FIG. 1 is an isometric view of the completely installed thermal insulation jacket showing a cut-away side view of the insulating foam middle and inner layers connected to a foam triggering device.

Referring to the drawings in detail, FIG. 1 shows an isometric view of the completely installed insulation jacket where the means for housing the chemicals isocyanate and polyol are shown at 12. The connecting hoses, 14a and 14b, are connected on one end to twin aerosol cans (not illustrated), and on the other end to a common mixing nozzle, 17, which is shown inserted into outer jacket slot 16, to allow the combination of the aforesaid chemicals which forms the closed-cell polyurethane middle layer, 24. The outer layer, 20, composed of a heat and water-resistant material, shown as overlapping itself at 30. Four quick-release buckles, as illustrated in 22a, are fastened to their co-operating straps, 22b, and are located along the opposite ends of the outer jacket layer, with at least two of the buckles being separated by a u-shaped concavity 23, contained on opposite ends of the outer layer.

A continuous perimeter seam, 26, joins the outer and inner layers of the jacket forming the outer boundaries of a pocket containing the middle layer, 24. The right-hand side of FIG. 1 shows an end portion of the outer jacket, demonstrating the final position of the outer layer, 20, relative to the middle layer, 24, and the inner layer, 25, as well as the final location of the transverse center seam, 28. The inner layer, 25, is shown as conforming to the shape of the underlying pipe, 10, with the protruding upper portion of the pipe accouterment shown at 18.

Figure 2:
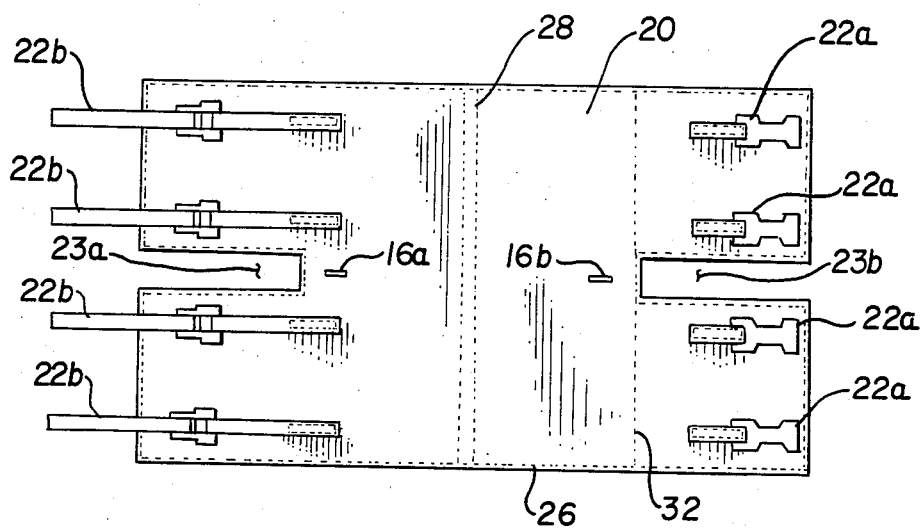
FIG. 2 is a top plan view of the exterior of the thermal insulation jacket in its flattened state prior to insertion of the middle insulating layer and installation.

FIG. 2 shows a top plan view of the exterior of the flattened insulation jacket prior to installation. The perimeter seam 26, forms a continuous outer margin. A transverse center seam, 28, divides the outer jacket layer into two halves, with the second half being further divided into two portions by the presence of a second transverse seam, 32.

Two slots, 16a, and 16b, are provided in the outer layer and are separated by the transverse center seam, 28. Buckles, 22a, and their co-operating straps, 22b, are shown an opposite ends of the outer jacket. At least two of these buckles are separated by a u-shaped concavity, 23a, and at least two of their co-operating straps are also separated by a u-shaped concavity, 23b.

Figure 3:
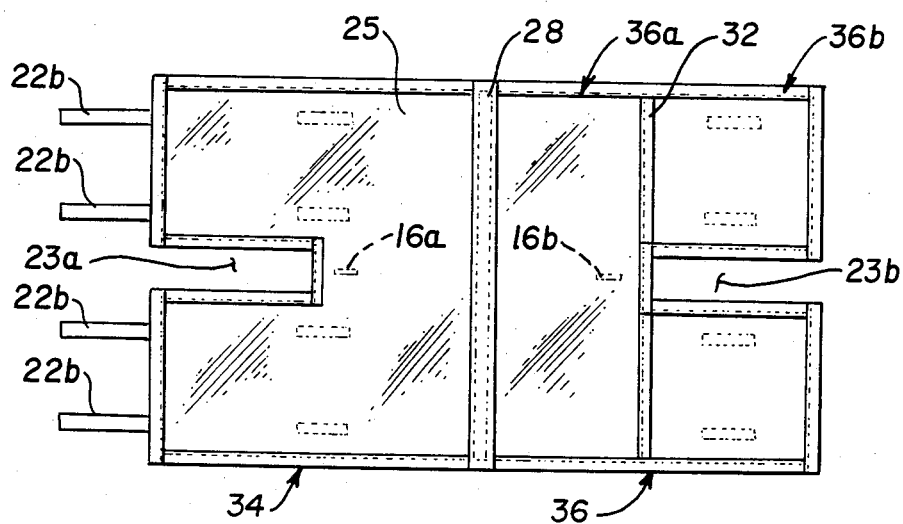
FIG. 3 is a bottom plan view of the interior of the insulation jacket in its flattened state, illustrating the attachment of the inner layer to portions of the outer layer through transverse and perimeter seaming of the two layers.

FIG. 3 shows a bottom plan view of interior of the insulation jacket in its flattened state and illustrates the attachment of the inner layer to the portions of the outer layer delineated by two transverse seams and a perimeter seam. The transverse center seam, 28, divides the interior of the jacket into two halves, 34 and 36, with the second half being further divided into two portions 36a, and 36b, by a second transverse seam, 32.

The flexible inner layer, 25, is joined to the outer layer along the perimeter seam, 26, at the transverse center seam, 28, and at the transverse seam, 32, forming pockets bounded by the first half of the outer layer and the first portion of the second half of the outer layer of the jacket.

Figure 4:
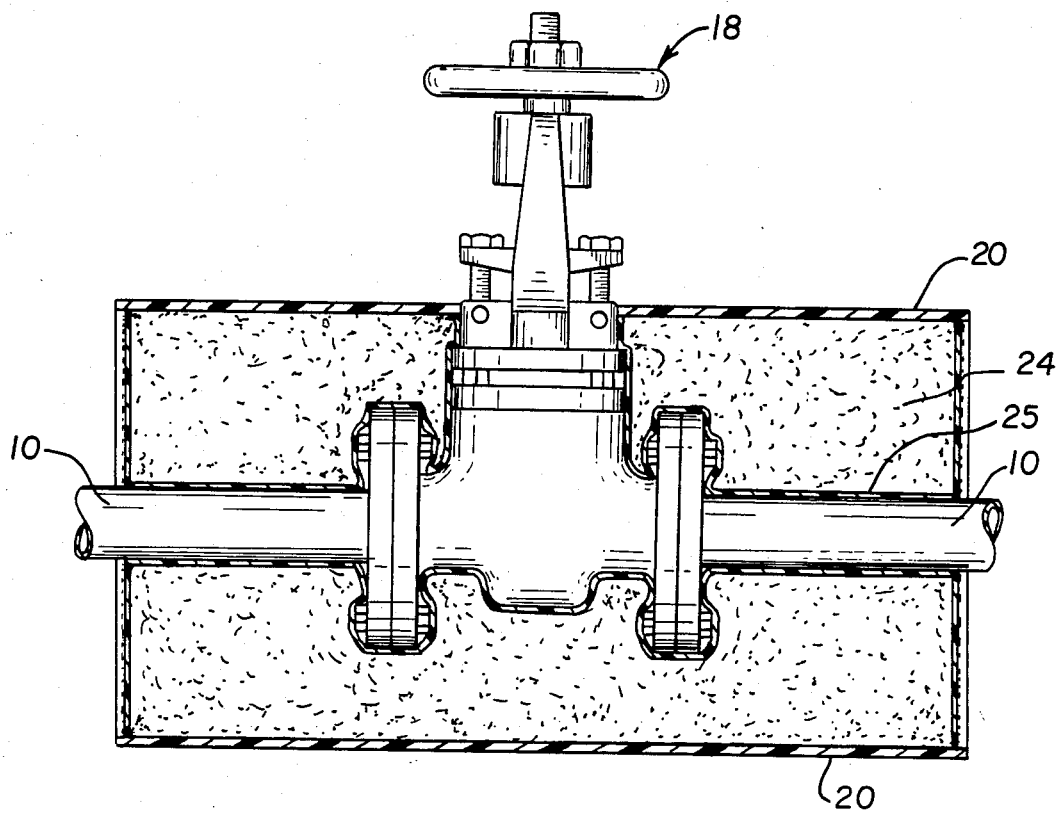
FIG. 4 is a cross-sectional view of the insulation jacket taken along line 4—4 of FIG. 1, after installation around a pipe accouterment.

FIG. 4 shows a cross-sectional view of the fully-formed insulation jacket after installation. The pipe, 10, and its accouterment, 18, which protrudes upwardly through the jacket, are shown encased by the inner layer, 25, the middle layer, 24, and the outer layer 20. The inner and middle layers have completely conformed to the shape of the underlying pipe accouterment, thus providing superior insulation to the pipe accouterment.

Figure 5:
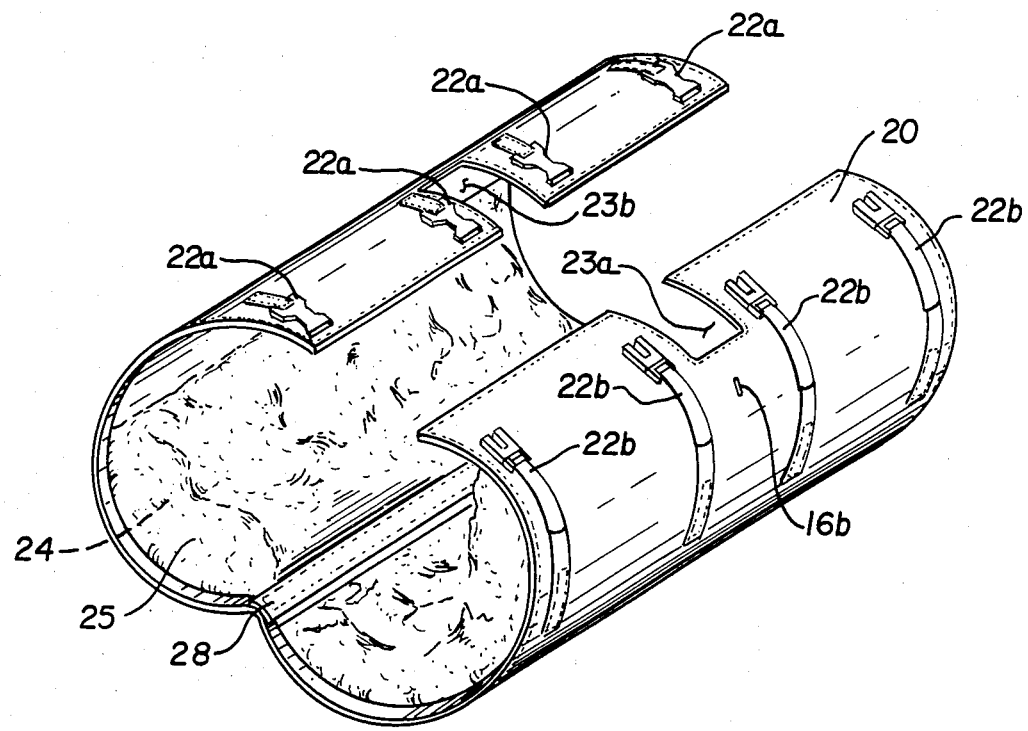
FIG. 5 is an isometric view of the fully-molded insulation jacket after removal from the pipe, illustrating the hinge-like function of the transverse center seam to facilitate removal.

FIG. 5 shows an isometric view of the fully-molded insulation jacket after removal from the accouterment. The outer layer, 20, has assumed a relatively rigid and circular final shape, while the rigid middle and inner layers have completely conformed to the shape of the underlying accouterment. The transverse center seam, 28, which joins the outer and inner layer is seen as having assumed a hinge-like appearance facilitating the removal of the jacket from the accouterment. The buckles, 22a, and their co-operating straps, 22b, are shown unfastened.

I claim:

1. A multi-layered, unitary, removable, and reuseable thermal insulating jacket for pipe accouterments, valves, and the like, which comprises:
    (a) a generally rectangular outer layer, said outer layer fabricated out of a flexible, non-shrinkable, non-elastic heat and water-resistant material and having two sides and two ends;
    (b) a generally rectangular inner layer fabricated out of a flexible, heat-shrinkable plastic material, having two sides and two ends, and joined to said outer layer by a seam which extends around the perimeter of the inner layer, said inner layer adapted to conform to the shape of the pipe accouterment, valve or the like upon heating;
    (c) a central transverse seam joining said inner and outer layers and extending from side to side of said jacket to form two sully-enclosed, independent pockets between said inner and outer layers;
    (d) a middle layer of rigid-cell polyurethane foam contained within said pockets; and
    (e) means to secure said jacket around the pipe accouterment valve or the like whereby said pockets are positioned on opposite sides of said pipe accouterment, valve or the like with said inner layer positioned immediately adjacent thereto.

2. An insulation jacket, according to claim 1, wherein one of the two ends of the generally rectangular inner layer is shorter in length than a corresponding end of the outer jacket layer.

3. An insulation jacket according to claim 1, wherein each of said pockets has an opening or grommet therein to allow for the insertion of said polyurethane foam middle layer.

4. An insulation jacket according to claim 1, wherein each end of the jacket contains a u-shaped concavity adapted to correspond to the neck of the pipe accouterment.

5. An insulation jacket according to claim 1, wherein the rigid polyurethane middle layer is formed within said pockets from a mixture of the chemicals polyol and isocyanate.

6. An insulation jacket according to claim 1, wherein the inner layer is composed of a flexible film of polyurethane plastic.

7. An insulation jacket according to claim 1, wherein the outer layer is composed of silicon-treated fiberglass fabric.

8. An insulation jacket according to claim 1, wherein the polyurethane foam middle layer has a density of at least 4.0 pounds per cubic foot.

9. An insulation jacket according to claim 1, wherein the means for securing the jacket around the pipe are at least two buckles located on the outer layer at one end of said jacket and at least two co-operating straps adapted to receive said buckles located on the outer layer at the other end of said jacket.

* * * * *